United States Patent [19]

Springer

[11] 4,419,479
[45] Dec. 6, 1983

[54] REINFORCED CARBOXY NITRILE POLYMER COMPOSITIONS CONTAINING PARTICULATE NICKEL

[75] Inventor: Virgil E. Springer, Corsicana, Tex.

[73] Assignee: Regal International, Inc., Corsicana, Tex.

[21] Appl. No.: 458,029

[22] Filed: Jan. 14, 1983

[51] Int. Cl.³ .......................... C08K 3/08; C08K 5/33; C08G 79/00; C08F 220/46

[52] U.S. Cl. .................................... 524/413; 523/303; 524/176; 524/204; 524/440; 524/522; 528/362; 528/371; 428/36

[58] Field of Search ............... 524/204, 413, 440, 522; 523/303; 528/362, 371; 428/36

[56] References Cited

U.S. PATENT DOCUMENTS

| | | | |
|---|---|---|---|
| 2,748,099 | 5/1956 | Bruner et al. | 524/440 |
| 2,880,186 | 3/1959 | Barth | 524/522 |
| 3,871,901 | 3/1975 | Carlsson et al. | 524/204 |
| 3,969,317 | 7/1976 | Johnson | 524/440 |
| 3,975,356 | 8/1976 | Dickens | 524/431 |
| 3,984,907 | 10/1976 | Vossen et al. | 428/461 |
| 4,061,825 | 12/1977 | Counsell et al. | 428/355 |
| 4,256,627 | 3/1981 | Moser et al. | 524/100 |
| 4,340,515 | 7/1982 | Frassek et al. | 524/274 |
| 4,370,440 | 1/1983 | Schwarz | 524/522 |
| 4,376,838 | 3/1983 | Davis et al. | 524/184 |

FOREIGN PATENT DOCUMENTS

| | | | |
|---|---|---|---|
| 678341 | 1/1964 | Canada | 524/440 |
| 1252341 | 10/1967 | Fed. Rep. of Germany | 524/204 |
| 54-112944 | 9/1979 | Japan | 524/440 |

*Primary Examiner*—Melvyn I. Marquis
*Assistant Examiner*—Herbert J. Lilling
*Attorney, Agent, or Firm*—John F. Booth; Gerald G. Crutsinger; Monty L. Ross

[57] ABSTRACT

Reinforced polymer compositions comprising a minor effective amount of a particulate metal reinforcing agent are provided. A preferred particulate metal reinforcing agent preferably comprises a plurality of discrete particles, each further comprising nickel, chromium and titanium carbide. Polymer compositions adapted to undergo a color change when subjected to a particular thermal history for a particular time interval are also provided.

22 Claims, No Drawings

REINFORCED CARBOXY NITRILE POLYMER COMPOSITIONS CONTAINING PARTICULATE NICKEL

TECHNICAL FIELD

This invention relates to reinforced polymers, and more particularly, to reinforced elastomeric compounds exhibiting superior abrasion resistance, temperature resistance, impact strength, fuel resistance and gas impermeability. One aspect of the invention relates to polymeric compounds that are reinforced with a metallic crosslinking agent. Another aspect of the invention relates to a rubber-metal composite comprising a carboxylated nitrile elastomer crosslinked by metal particles further comprising nickel, chromium and titanium carbide. Yet another aspect of the invention relates to improved reinforced rubber products for use in the oil and gas drilling and production industry. A further aspect of the invention relates to a method for making the subject rubber-metal composites.

BACKGROUND OF THE INVENTION

The need for high quality rubber products has long been appreciated by those working in industry. This need is particularly apparent in the oil and gas industry, where numerous types of rubber products are utilized in drilling operations and in producing liquid and gaseous hydrocarbons from subterranean wells. Commonly used rubber products include, for example, stripper rubbers, hydraulic stuffing rubbers, injector rubbers, swab cups, pipe wipers, blowout preventer rubbers, O-rings, packer rubbers, drill pipe protectors and rotors for downhole pumps and motors. Because the foregoing products are typically used downhole, they are frequently subjected to extreme temperatures and pressures, severe mechanical stresses and abrasion, and continuous attack by a wide variety of degrading, scavenger liquids and gasses, which tend to break the polymer crosslinks, thereby causing the parts to fail. Accordingly, rubber parts are needed that can perform well under repeated use in such adverse and hostile conditions. Rubber compounds intended for downhole use should therefore exhibit good mechanical properties and resistance to abrasion, heat, water, fuels, chemicals, and gases. Furthermore, they should be readily vulcanizable, and should provide good processability.

Nitrile rubbers have long been recognized for their abrasion resistance and superior mechanical properties, particularly when reinforced by carbon black or mineral fillers. Conventional nitrile rubbers are copolymers of butadiene and acrylonitrile, and are commercially available in a wide range of monomer ratios from many sources. More recently, carboxylated nitrile rubbers have been recognized as providing a tough, hard vulcanizate with a higher abrasion resistance, modulus, tensile strength and tear strength than conventional nitrile rubbers. Carboxylated nitrile rubbers are also more easily workable and flow better than nitrile rubbers at conventional molding temperatures. Problems with scorching and bin stability that were encountered early on have been overcome to a great extent by using specially developed curative masterbatches and processing aids.

However, notwithstanding the improvements that have already been made, there remains a need for reinforced polymeric compounds that are readily processable, but which exhibit physical and mechanical properties that are superior to those achieved with the commercially available elastomers. Such compounds are disclosed herein.

SUMMARY OF THE INVENTION

According to the present invention, particularly desirable reinforced polymers having unexpectedly superior properties are made by incorporating into the polymers a minor amount of a particulate metallic reinforcing agent.

According to a preferred embodiment of the invention, reinforced elastomers are provided that comprise up to about 50 parts by weight of a metal particulate per 100 parts by weight of elastomer.

According to another preferred embodiment of the invention, a reinforced polymer is provided that comprises an elastomer crosslinked at least in part by a minor amount of a particulate metal reinforcing agent comprising a mixture of nickel and chromium.

According to another preferred embodiment of the invention, a reinforced rubber compound is provided that comprises a rubbery polymer having dispersed therein a plurality of metallic particles, each of which further comprises nickel, chromium and titanium carbide.

According to another preferred embodiment of the invention, a reinforced rubber compound is provided that comprises carboxylated nitrile rubber crosslinked with divalent metal particles that are dispersed along the polymer chains.

According to another preferred embodiment of the invention, a reinforced rubber compound is provided that comprises a carboxylated nitrile rubber having distributed therethrough a plurality of metal particles, each of which further comprises a nickel-chromium base.

According to another preferred embodiment of the invention, improved rubber products are provided for use in oil field applications, the rubber portions of which comprise carboxylated nitrile rubber having a plurality of discrete metallic particles randomly dispersed therein and chemically bonded to the polymer chains.

According to another preferred embodiment of the invention, improved drill pipe protectors are provided which comprise a metal cage substantially surrounded by a rubber compound comprising carboxylated nitrile rubber reinforced by a plurality of metallic particles dispersed therein and chemically bonded thereto, said particles preferably comprising an alloy of nickel and chromium and having smaller particles of titanium carbide distributed therethrough.

According to another preferred embodiment of the invention, rubber products intended for oil field applications are provided that will undergo a color change after being subjected to predetermined temperature levels for a specified time interval.

According to another preferred embodiment of the invention, a method is provided for compounding the rubber compositions that are disclosed herein and that are suitable for use in the apparatus of the invention.

The compounds of the invention are believed to exhibit physical properties that are unexpectedly superior to those of the prior art compounds. Moreover, through use of the formulations and methods disclosed herein, reinforced carboxylated nitrile rubber compounds are provided that can be more easily and effectively processed during the manufacture of rubber goods.

The present invention is further described and explained in relation to the description of the preferred embodiments and the examples which are set forth below.

DESCRIPTION OF THE PREFERRED EMBODIMENTS

Carboxylated nitrile rubbers are terpolymers of acrylonitrile, butadiene and carboxylic acid. There are various grades of carboxylated nitrile rubbers, which principally differ according to the acrylonitrile content, the viscosity and the concentration of carboxyl groups in the polymer molecules. A preferred carboxylated nitrile rubber for use in the present invention is marketed under the tradename KRYNAC 221 by Polysar Limited of Sarnia, Ontario, Canada. KRYNAC 221 is a cold, emulsion polymerized nitrile rubber having a medium-high carboxyl level and medium oil resistance.

Typical raw polymer properties for KRYNAC 221 are set forth in Table I below:

TABLE I

| Raw polymer viscosity, ASTM D 1646 ML 1 + 4 (100° C.) | 50 |
|---|---|
| Volatile matter, ASTM D 1416 (wt. %) | 0.25 |
| Total ash, ASTM 0 1416 (wt. %) | 0.7 |
| Solubility in MEK (wt. %) | 99.0 |
| Specific gravity | 0.98 |

Although KYRNAC 221 is a preferred elastomer for use in the reinforced polymeric compounds disclosed herein, it is understood that other polymers can also be employed within the scope of the invention. Such polymers can include, for example, other carboxylated nitrile rubbers as well as other elastomers such as nitrile, neoprene, fluoroelastomer, silicone, polyisoprene, styrene butadiene, ethylene propylene diene, and the like. In addition, significant and unexpected improvements can also be achieved in the physical properties of various other thermoplastic and thermosetting polymeric resins in accordance with the present invention. Thus, for example, the abrasion resistance of various acrylic resins and epoxies can also be significantly enhanced by reinforcing them with a particulate metallic reinforcing agent as disclosed herein. It is to be understood, of course, that the preferred formulations disclosed herein are primarily directed to reinforced carboxylated nitrile polymers, and that other known formulations similarly useful for other polymers can be similarly modified to include a particulate metallic reinforcing agent by one of ordinary skill in the art having the benefit of the teachings contained in this specification.

According to a preferred embodiment of the invention, rubber goods having particularly desirable properties are made by incorporating into the rubber a minor amount of a fine particulate metal filler. The amount of particulate metal filler will preferably range from about 0.5 to about 10 parts by weight, and most preferably from about 1 to about 5 parts by weight, per 100 parts by weight of rubber. In some instances, up to about 50 parts by weight of metal filler can be employed within the scope of the invention. However, in such instances, the number of metal particles is likely to exceed the number of sites that are available for crosslinking within the polymer structure. The manner in which the metal particles are believed to function within the reinforced compounds of the invention is discussed in further detail below.

Once the available crosslinking sites are occupied, any remaining metal particles serve as filler material that is mechanically bonded rather than chemically bonded within the polymer and contributes less significantly to the enhancement of the polymer properties. At some point, such as for example about 50 parts by weight per 100 parts by weight of rubber, the amount of filler material becomes so great that the properties of the polymer are adversely affected. Conversely, when less than about one part by weight of metallic reinforcing agent is utilized per 100 parts by weight of polymer, the contribution by the metal particles to the overall properties of the reinforced polymer may not be readily observable. The amount of particulate metal that can be successfully employed in the compositions of the invention can also vary according to the particular polymer, the size and type of the particulate metal, the types and amounts of the other constituents in the formulation, the processing conditions, and the desired end use.

A metal reinforcing agent that has proved to be satisfactory when used in the rubber compounds of the invention is marketed under the tradename RESISTIC GRADE NC 530 by ResisTic Materials, Inc. of Houston, Texas. RESISTIC GRADE NC 530 is said to comprise a plurality of discrete particles having a particle size ranging from about 44 to about 74 microns and a mesh size of about $-200+325$. Each of the fine metallic particles is said to be a tertiary matrix composed of very hard, inert and rounded subparticles of titanium carbide which are dispersed within a continuous phase of nickel-chromium alloy.

Published physical properties for RESISTIC GRADE NC 530 are set forth in Table II below:

TABLE II

| PROPERTIES | RESISTIC GRADE NC |
|---|---|
| Temperature limitation, (°C.) | 2,000 |
| Hardness (HRC) | 54 |
| Specific gravity (gm/cc) | 6.67 |
| Density (lbs/cu. in) | 0.24 |
| Thermal conductivity (cal/(sec.C-Cm)) | 0.06 |
| Electrical resistivity Ohm mm/M) | 1.2 |
| Elastic modulus (ksi) | 45,000 |
| Compressive strength (ksi) | 270 |
| Coefficient of friction | 0.08 |

When incorporated into the rubber compounds of the invention according to the methods disclosed herein, the particulate metal is believed to function as a reinforcing agent, greatly increasing the strength, abrasion resistance and temperature resistance of the rubber. Although the mechanism by which the reinforcing media operates to produce the significantly improved physical properties is not fully understood, it is believed that the metallic particles enter into the crosslinking reactions within the rubber during curing and vulcanization.

A conventional nitrile rubber forms crosslinks through the reaction of sulfur and accelerators with the carbon atoms in the polymer chain. Carboxylated nitriles form additional crosslinks through the reaction of curing agents with the carboxyl groups on the polymer chain. Heretofore, divalent metal oxides have been utilized for increasing the state of cure of carboxylated nitrile vulcanizates. Zinc oxide, in particular, is favored as a standard curative since it is included in most rubber cure systems as an accelerator/activator. The additional crosslinks obtained through use of a divalent metal oxide in combination with carboxylated nitriles lead to properties that differ from those obtained with conventional nitrile rubbers. These changes are all believed to be the direct result of higher crosslink density. These properties allow carboxylated nitrile rubbers to withstand greater pressures than conventional nitrile rubbers, and also contribute to increased abrasion resistance and high temperature resistance. Tensile strength, modulus and hardness tend to be higher for carboxylated nitrile rubbers, while elongation is lower.

However, notwithstanding the benefits that have previously been obtained through the use of divalent metal oxides as curatives, it has now been discovered that the use of a particulate metal reinforcing agent greatly enhances the polymer properties in a manner that has never before been known or appreciated. By utilizing the particulate metal reinforcing agent together with the zinc oxide, it is believed than an even stronger crosslinking reaction occurs, resulting in the formation of a rubber-metal composite having outstanding physical and mechanical properties. These outstanding properties may extend over a wide range of products and are not restricted to products utilized in the oil and gas industry.

Although the interaction between the divalent metal oxide, the particulate metal reinforcing agent, and the carboxyl groups of the polymer chain is not fully understood, it is believed that the nickel component of the preferred reinforcing agent is the primary contributor to the improved crosslinking experienced with the compositions of the invention. And while the improved crosslinking is believed to account for much of the observed improvement in the physical properties of the reinforced polymer, the resistance to abrasion is believed to be particularly enhanced by the presence of the titanium carbide subparticles within the particulate metal reinforcing agent. During the compounding process, the particulate metal reinforcing agent is desirably homogeneously dispersed throughout the polymer. Thus, when the polymer is molded into finished products, a portion of the particulate metal is evenly distributed at or near the outer surface. According to a preferred embodiment, each such particle contains very hard dispersed subparticles of titanium carbide, which are believed to greatly contribute toward reducing the coefficient of friction between the polymer surface and any adjacent metal surface, or the like.

While the compositions of the invention are discussed above in terms of general proportions and functions, the manner in which they are made is further described in the example set forth below:

EXAMPLE

A batch of the reinforced carboxylated nitrile polymer of the invention was made employing a conventional Shaw rotor mixer and an open mill. First using the Shaw mixer, 85 parts by weight of KRYNAC 221 were combined with 1.8 parts by weight of a fatty acid lubricant, 1.28 parts by weight sulfur, 0.26 parts by weight N-(cyclohexylthio)-phthalimide, 1.7 parts by weight stearic acid, 1.7 parts by weight of a polymerized 1,2-dihydro-2,2,4-trimethylquinoline, and 0.86 parts by weight RESISTIC. The N-(cyclohexylthio)-phthalimide was employed as a retarder to avoid precuring the polymer during compounding. The amount of retarder employed can be varied according to the degree of preforming to which the polymer is subjected. Mixing in the Shaw mixer continued for about 2.5–3 minutes.

To the foregoing mixture was then added about 21 parts by weight carbon black, 0.86 parts by weight of a high molecular weight fatty acid, and 18 parts by weight of a dry liquid concentrate of di(2-ethylhexyl) phthalate which were premixed before adding them to the KRYNAC 221 admixture in the Shaw mixer. About half of the premixed ingredients was first added, and the temperature was brought up to about 138° C. The other half was then added, and the temperature was brought up to about 160° C. and dumped.

Once the foregoing constituents were thoroughly mixed, the batch was cooled for four hours and then transferred to an open mill, where the following constituents were then added: 1.1 parts by weight of tetramethylthiuram monosulfide, 0.18 parts by weight tetramethylthiuram disulfide, and 9.5 parts by weight of PA-50. PA-50 is a zinc peroxide curative available from Polysar, Inc. of Sarnia, Ontario, Canada, which was specifically designed for use with KRYNAC 221. The combined ingredients were thereafter blended for about four minutes on the open mill.

Because the RESISTIC is compounded into the polymer and subjected to a temperature increase prior to adding the zinc peroxide, it is believed that the metal particles will partially crosslink the polymer, after which the zinc will occupy the remaining active sites.

After being slabbed and removed from the open mill, the reinforced polymer composition was extruded into strips which were molded around metal skeletons to form the subject drill pipe protectors. When the drill pipe protectors were removed from the molds, they exhibited improved properties not previously observed with drill pipe protectors made with conventional nitrile rubber. For example, the drill pipe protectors made according to the present invention exhibited higher gloss, increased density, toughness and abrasion resistance when compared to the prior art drill pipe protectors.

According to another embodiment of the invention, the subject composition is further improved by the addition of a minor amount of dimethylglyoxime. When dimethylglyoxime is added to the formulation and dispersed throughout the polymer together with the particulate metal reinforcing agent, it can function as an indicator of the thermal history of the resultant polymer. Many rubber products such as drill pipe protectors are intended to be used repeatedly until such time as they are unfit to perform the function for which they are designed. The thermal history to which rubber products have been subjected during previous use can be an important consideration in determining whether or not those products are likely to perform satisfactorily during continued use. It has now been discovered that by incorporating a minor effective amount of dimethylglyoxime into the nickel-containing reinforced polymers made according to the present invention, a color change will take place in the polymer once the polymer has been exposed to high temperatures for a significant period of time. Preferably, the amount of dimethylglyoxime will range from about 1 to about 5 parts by weight per 100 parts by weight rubber. This color change is believed to take place when the dimethylglyoxime reacts with nickel upon reaching a temperature ranging from about 200°–235° C. in an oil-solvent and- /or water medium. Thus, once the rubber part has been subjected to operating temperatures within the approximate range of about 200°–235° C. or above, a red color develops in the part where the dimethylglyoxime and nickel have contacted each other. Because polymers containing carbon black typically appear black in color, the color change attributable to the reaction between the dimethylglyoxime and nickel may be observed as a reddish cast that becomes apparent upon a predominantly black part after being operated within the required temperature range. Also, it should be understood that the degree of color change that is visually apparent will likely depend upon the relative amounts of dimethylglyoxime and reactive metal that are present in the composition, as well as the temperatures, time intervals and fluid medium to which the polymer is subjected.

While the invention is described herein in relation to its preferred embodiments, it is understood that various modifications thereof will be apparent to those of ordinary skill in the art upon reading the specification and it is intended to cover all such modifications as fall within the scope of the amended claims.

What is claimed is:

1. A reinforced polymer carboxylated nitrile composition comprising a minor effective amount of a particulate nickel metal reinforcing agent.

2. The composition of claim 1 wherein said particulate metal reinforcing agent is chemically bound within the polymer structure.

3. The composition of claim 2 wherein the particulate metal reinforcing agent functions so as to crosslink the polymer chains in said polymer.

4. The composition of claim 1 wherein said particulate metal reinforcing agent comprises an alloy of nickel and chromium.

5. The composition of claim 4 wherein said particulate metal reinforcing agent comprises an alloy of nickel and chromium having smaller particles of titanium carbide distributed therethrough.

6. The composition of claim 1 wherein said particulate metal reinforcing agent is present in an amount ranging up to about 50 parts by weight of said particulate metal reinforcing agent per 100 parts by weight of polymer.

7. The composition of claim 6 wherein said particulate metal reinforcing agent is present in an amount ranging from about 0.5 to about 10 parts by weight per 100 parts by weight of polymer.

8. The composition of claim 7 wherein said particulate metal reinforcing agent is present in an amount ranging from about 1 to about 5 parts by weight per 100 parts by weight of polymer.

9. The composition of claim 1 wherein said particulate metal reinforcing agent further comprises a plurality of discrete metal particles having particle diameters ranging from about 44 to about 74 microns.

10. The composition of claim 1 wherein said particulate metal reinforcing agent further comprises a plurality of discrete metal particles having a mesh size of about $-200+325$.

11. The composition of claim 10 wherein said particulate metal reinforcing agent comprises at least one divalent nickel metal.

12. The composition of claim 11 wherein each metal particle comprises an alloy of nickel and chromium.

13. A reinforced polymer composition of claim 1 comprising an elastomer crosslinked at least in part by a minor effective amount of a particulate metal reinforcing agent.

14. The composition of claim 13 wherein each said particle further comprises a mixture of nickel and chromium.

15. The composition of claim 14 wherein each said particle further comprises nickel, chromium and titanium carbide.

16. Rubber-containing products, the rubber portions of which comprise carboxylated nitrile rubber having a plurality of discrete metallic nickel particles randomly dispersed therein and chemically bonded thereto.

17. Drill pipe protectors comprising a metal skeleton substantially surrounded by rubber compound comprising carboxylated nitrile rubber reinforced by a plurality of metallic particles dispersed therein and chemically bonded thereto, said particles further comprising an alloy of nickel and chromium.

18. The drill pipe protectors of claim 17 wherein said metallic particles further comprise smaller particles of titanium carbide distributed therethrough.

19. A polymer composition of claim 1 adapted to undergo a color change after being subjected to predetermined temperature levels for a specified time interval.

20. The composition of claim 19 wherein said polymer comprises a minor effective amount of particulate metal and dimethylglyoxime.

21. The composition of claim 20 wherein said particulate metal is present in an amount ranging up to about 5 parts by weight per 100-parts by weight of polymer.

22. The composition of claim 20 wherein said dimethylglyoxime is present in an amount ranging up to about 5 parts by weight per 100 parts by weight of polymer.

* * * * *